United States Patent [19]
Poe et al.

[11] Patent Number: 5,857,063
[45] Date of Patent: Jan. 5, 1999

[54] MULTICOLORANT PROCESS CONTROL

[75] Inventors: Robert F. Poe, Charlestown; H. S. Gregory, Jr., Bedford, both of Mass.

[73] Assignee: Eastman Kodak Company, Rochester, N.Y.

[21] Appl. No.: 825,137

[22] Filed: Mar. 27, 1997

[51] Int. Cl.$^6$ .............................. B41B 15/00; B41J 15/00; G06F 15/00; H04N 1/46
[52] U.S. Cl. ........................ 395/109; 358/515; 358/518; 358/524; 358/529; 382/162; 382/167; 345/186; 345/199
[58] Field of Search .................................... 358/515, 518, 358/517, 529, 523, 524, 522, 527; 395/109; 345/186, 199; 382/162, 167

[56] References Cited

U.S. PATENT DOCUMENTS

| | | | |
|---|---|---|---|
| 5,072,305 | 12/1991 | Numakura et al. | 358/523 |
| 5,285,297 | 2/1994 | Rose et al. | 358/518 |
| 5,296,935 | 3/1994 | Bresler | 358/500 |
| 5,315,380 | 5/1994 | Ingraham et al. | 358/500 |
| 5,615,282 | 3/1997 | Spiegal et al. | 358/518 |

*Primary Examiner*—Kim Yen Vu
*Assistant Examiner*—Kimberly A. Williams
*Attorney, Agent, or Firm*—Peyton C. Watkins

[57] ABSTRACT

A computer product for controlling a color-reproduction process employing N colorants, where N is greater than 3, the computer program product comprises: a computer readable storage medium having a computer program stored thereon for performing the steps of: defining a first transformation from a N-dimensional colorant-signal space associated with the color-reproduction process to a 3-dimensional colorimetric space such that each combination of N colorant signals is mapped to a visual color that would be produced by the process in response to that combination of signals; defining a second transformation for mapping from a 3-dimensional parameter space into the N-dimensional colorant-signal space for defining a particular 3-dimensional subspace of the N dimensional colorant-signal space for ultimately restricting the permitted combinations of the N colorant signals; combining the first and second transformations for defining a third transformation for transforming data directly from the 3-dimensional parameter space to the 3-dimensional calorimetric space; finding the mathematical inverse of the third transformation for defining an inverse transformation which transforms data from the 3-dimensional calorimetric color space to the 3-dimensional parameter space.

3 Claims, 3 Drawing Sheets

MULTICOLORANT PROCESS CONTROL

FIELD OF INVENTION

The invention relates generally to the field of color reproduction, and in particular to processes employing more than three colorants. More specifically, the invention relates to a 4-colorant process.

CROSS REFERENCE TO RELATED APPLICATIONS

The present invention is related to concurrently filed and commonly assigned, co-pending patent application Ser. No. 08/825,039 (Docket 74268PCW), by Michael Schwartz and Robert Poe entitled "A COMPUTER PROGRAM PRODUCT FOR MODIFYING THE BLACK CHANNEL OF AN OUTPUT DEVICE PROFILE WITHOUT ALTERING ITS COLORIMETRIC ACCURACY."

BACKGROUND OF THE INVENTION

It is well known from color-matching experiments that the human visual system, under normal conditions, is trichromatic in nature. Color information is acquired in the retina by absorption of light in three distinct types of sensor cells (the "cones") having different broad-band spectral sensitivities. The neural signals generated in the retina, therefore, can be represented mathematically as a vector in a 3-dimensional space. A number of different 3-dimensional vector spaces have been used to represent visual colors; most notable are those defined over the years by the Commission Internationale de l'Eclairage (CIE), such as CIE 1931 XYZ, CIE 1976 L*a*b* (CIELAB), and CIE 1976 L*u*v* (CIELUV). In these spaces, a point represents a color visually distinct from those represented by all other points. The CIE has established and recommended practices for measuring and computing the coordinates in these spaces corresponding to real objects and illuminants; these practices together are known as colorimetry.

A corollary of the trichromatic nature of color vision is that the satisfactory reproduction of colors requires the use of 3 independent colorants. Three degrees of freedom are required in the color-reproduction system in order to vary the color stimulus over the 3 dimensions sensed by the human retina. For instance, color television and computer monitors use an additive set of red, green, and blue (RGB) phosphors. Color photography is based on a subtractive set of cyan, magenta and yellow (CMY) dyes. A number of printers and copiers also rely on overprints of CMY colorants.

Nonetheless, many systems use more than the required 3 colorants. Any reproduction process has a limited gamut, or range, of reproducible colors. The use of additional colorants can expand the gamut. Furthermore, particular additional colorants may be used to stabilize the reproduction process for particularly important colors, such as neutrals.

Most commonly, black is added to the set of subtractive primaries. In offset printing, for example, the use of black ink increases the dynamic range of the process, by permitting the reproduction of darker neutrals. It also stabilizes the process somewhat against mis-registration of the halftone screens and batch variations in the primary inks.

Examples of such processes are:
offset lithography, in which the "four-color process" employs printing inks as colorants applied to paper, in a halftone screen pattern, by a printing press;
gravure printing, which also employs printing inks applied to paper;
off-press proofing systems, which employ toners as colorants to simulate the effect of an offset press;
computer-driven printers, which use a variety of technologies and colorants, such as jettable inks, toners, and dyes, applied in various continuous-tone, halftone, or dithered patterns.

Most of these processes make use of three chromatic colorants. In addition they may use an achromatic, or black, colorant (abbreviated as K). Thus, the chief application of the current invention is for CMYK systems, although it is clearly generalizable to systems using additional chromatic colorants, such as red, orange, pink, green, or blue.

Since the colorant space in these CMYK systems has a higher dimension (4) than the visual color spaces (3), there is generally no unique way to reproduce a given color. Typically, in fact, there is an infinite number of possible CMYK overprints that can render the same visual color. The resulting ambiguity in determining the rendering of colors has to be resolved by imposing constraints and aims on the overprints. For offset printing, for example, these take the form of restrictions on the total area coverage (TAC) of the 4 halftone separations and preferences in the utilization of black ink; these restrictions and preferences arise mostly from practical considerations of press control, quality assurance, cost reduction, etc., rather than from the intrinsic nature of color reproduction.

The current invention is a method of imposing such constraints and aims in a flexible and useful manner.

Color separations for offset printing have traditionally been produced from photographic originals through the use of RGB separation filters. Originally, these methods involved optical exposure of photographic transparencies. More recently, electronic scanning devices (first analog and subsequently digital) have been employed to separate the red, green, and blue content of the original image and convert the information into electrical signals. Typically, these RGB signals are then converted to CMY signals, which are then used to drive the printer, the film writer, or other output device. The simplest form of this conversion is the complement function:

$$C = 1 - R$$
$$M = 1 - G$$
$$Y = 1 - B$$

(Here the signals are assumed to range over the interval [0, 1].) This simple form is not usually satisfactory, because the physics of the CMY color-reproduction process is complex and not directly related to the spectral sensitivities of the RGB filters. An empirical color-correction matrix is usually needed to convert RGB to CMY in such a way as to preserve acceptable fidelity in the reproduced colors.

Subsequently, a K signal is generated, in order to add black to the CMY overprints. There are many ways to do this, and scanning systems provide many options that can be selected by the operator. Frequently, for instance, it is desirable to avoid using black entirely in the lighter parts of the image, but to increase its use progressively in the darker parts. In some cases, there is a preference to restrict the use of black to neutral colors (grays) and near-neutrals, while, in others, black continues to be used even for moderately saturated (but dark) colors In general, these possibilities can be implemented by making K a function of the primary signals. In particular, a common approach is to make K a function of the minimum of C, M, and Y (for instance, Gaulke and Jung, U.S. Pat. No. 4,482,917).

When black is added to an overprint, the amount of primary colorant must be reduced, in order to keep the color from darkening. Certain CMY overprints reproduce shades of gray and are, therefore, visually equivalent to certain quantities of black colorant printed alone. These neutral overprints typically require an approximately equal balance of the cyan, magenta, and yellow colorants, although the balance is not exact for most processes. These equivalent overprints can be used to compute the reduction in CMY that should accompany the addition of K in order to preserve an approximate shade of gray in a neutral overprint. If black is used in the printing of chromatic colors, somewhat different methods may be required to preserve color fidelity (Gaulke and Jung, op. cit.).

Various strategies have developed in the printing industry for using more or less black in printing various colors and adjusting the amount of primary colorant accordingly. These have been known as Under Color Removal (UCR), Grey Component Replacement (GCR), and Under Color Addition (UCA). Unfortunately, these terms have been used differently by different writers and have lost the precise meaning they may once have had. Accordingly, here these terms will be avoided, and a distinction will be made instead between the use of black on-axis (i.e., for neutrals) and off-axis (i.e., for chromatic colors). Regardless of the terminology, however, the usual approach has been to convert RGB to an initial CMY signal; K is generated on the basis of this CMY; the CMY is then readjusted, on the basis of K, in order to approximate the color that would have been printed by the initial CMY. Thus, the signal-processing chain is [RGB→(CMY)$_i$→CMYK], where the subscript "i" distinguishes the initial values.

Most of these earlier methods cannot automatically preserve color fidelity to a high degree of accuracy, because the conversion of RGB to (CMY)$_i$ and the conversion of (CMY)$_i$ to CMYK are not based on realistic models of the color-reproduction process. Scanning devices for the graphic arts, therefore, provide (analog or digital) controls so that a trained operator can adjust these conversions empirically to improve the results. This is a difficult procedure, requiring considerable time and skill. More recently, there have appeared a number of digital systems, based on colorimetry, that represent an improved technology. In these systems, a conversion is first made from the RGB scanner signals to a device-independent color space, such as CIELAB. This conversion, e.g., [RGB→L*a*b*], is based on a calorimetric characterization of the scanner. This is followed by a conversion from the device-independent space to the CMYK signals that drive the output device. This second conversion is based on a colorimetric characterization of the reproduction process (offset printing, off-press proofing, inkjet printing, dye-sublimation printing, etc.), so that the colors that are printed will be visual matches to the colors that were scanned, since they correspond to the same CIELAB coordinates.

The mathematics of this second conversion involves the inversion of a model of the process. Color patches are printed with various combinations of the CMYK control signals; colorimetric measurements and computations then yield the corresponding visual colors, represented, for instance, in CIELAB. A mathematical model can then be fitted to the colorimetric data, resulting in a representation of the [CMYK→L*a*b*] transformation. The inverse of this transformation must then be computed in order to implement the required conversion [L*a*b*→CMYK]. This computation is generally implemented by an iterative search technique, conducted at a regular sampling of points in CIELAB space. The results of the inversion are tabulated, and various interpolation methods can subsequently be used to compute an approximation to the inverse at arbitrary points.

The same problem that occurred in the older technology now reappears in a new form. Just as there is no unique transformation from RGB to CMYK, there is no unique inverse to [CMYK→L*a*b*] of the form [L*a*b*→CMYK]. In order to remove the ambiguity in the inverse, constraints must be applied.

A typical approach to this problem is disclosed in Van de Capelle et al. (U.S. Pat. No. 5,402,253), which is incorporated herein by reference. As in the older technology, the CMY signals are regarded as the independent dimensions of the colorant space; K, on the other hand, is treated as an extra dimension that must be assigned a specific value by imposing an additional constraint or relation. For instance, K could be assigned a constant value. This would obviously remove the ambiguity in the transformation and permit a unique inverse; however, it would not be of much practical use, since, if K were fixed to a constant non-zero value, it would be impossible to render white by leaving areas of an image blank. Therefore, the referenced patent teaches a more general approach in which K is made to depend on C, M, and Y, and, in particular, may depend on the minimum of C, M, and Y. This is similar to the approach used in the older technology; there is an important difference, however, in that the dependence is not on an initial (CMY)$_i$ which is subsequently readjusted. Instead, the relation that is imposed is a dependence of K on the final CMY. This is possible, in the newer technology, because the relation becomes a condition imposed on the iterative search for an inverse, rather than a particular step in a processing sequence.

Another way to look at this is that the relation between K and CMY defines a particular 3-dimensional subspace of CMYK-space. This subspace is selected in such a way that each overprint in the subspace reproduces a different color; i.e., no two points in the subspace map to the same point in CIELAB space. Thus, within the subspace, the inverse is unique.

A similar approach is disclosed in Rolleston et al. (U.S. Pat. No. 5,305,119 and No. 5,528,386). These authors similarly impose a relation between K and CMY. However, their method establishes the form of this relation prior to the calorimetric characterization. The color patches that are printed and colorimetrically analyzed consist of a sampling over CMY-space with the inclusion of K in the overprints as required by the relation. The model is then defined over this 3-dimensional space, and the 4-dimensional ambiguity is avoided from the beginning. The method is less flexible than that of Van de Capelle et al., however, since each choice of the relation requires that a different set of patches be printed and analyzed. For certain applications, such as graphic arts, it is more convenient to define and fit a calorimetric model over the 4-dimensional CMYK-space; various 3-dimensional subspaces can then be selected subsequently, at will, to obtain various behaviors of K with respect to CMY.

The technology described above is deficient in its ability to handle certain practical issues and requirements. For instance, many printing processes have a limitation in the total amount of colorant that can be deposited on a substrate without smearing or running. In offset printing, this is a limit on TAC (total area coverage), which is the sum of the fractional areas covered by the halftone dots in the 4 separations; it can be computed simply as (C+M+Y+K). The TAC limit is generally less than 4.0 ("400% dot coverage")

and often less than 3.0 ("300% dot coverage") in typical offset presses. These constraints are difficult to impose within the cited prior art.

Another deficiency in the art is in providing separate controls for the on-axis and off-axis usage of black colorant. The relation between K and CMY, if only a function of a single variable (the minimum of C, M, and Y), may provide a desired on-axis usage, but may then fail to provide the off-axis behavior that some printers may require.

Another deficiency has to do with alternative interpretations of "neutral". In a colorimetric sense, "neutral", or "achromatic", may be defined as "having the same chromaticity as the illuminant". Since the paper stock may impart a slight cast to the chromaticity at the white point, it may be more practical to define "neutral" as "having the same chromaticity as that of the light of the illuminant after reflection from the substrate". This may be regarded as the "true neutral", because the entire gray scale, from white to black, can then be reproduced at the same chromaticity. On the other hand, it has been common practice in offset printing to define "neutral" conventionally, in terms of certain proportions of the printing inks—typically, equal amounts of magenta and yellow, overprinted with a somewhat greater amount of cyan. These overprints, combined with various amounts of black, may not exactly reproduce a true neutral, but they are a close approximation and are preferred by many press operators for practical considerations of press control. Still another possibility, more applicable to computer-driven printers than to printing presses, is to define "neutral" in terms of equal, or balanced, amounts of the 3 primaries; this choice allows the primaries to range independently up to their maximum value, thus maximizing the gamut and dynamic range of the process, even though the darkest "balanced neutral" may have an appreciable color cast relative to the substrate chromaticity. It is difficult to accommodate these possible alternatives within the framework of the existing technology.

SUMMARY OF THE INVENTION

The present invention is directed to overcoming one or more of the problems set forth above. Briefly summarized, according to one aspect of the present invention, there is provided a more general solution to the problem of defining constraints and aims in CMYK or other colorant spaces having more than 3 dimensions. A feature of the present invention is to provide a parametric representation of the desired 3-dimensional subspace of the higher-dimensional colorant space. An abstract 3-dimensional parameter space is defined, in which the coordinates are allowed to range individually over the interval [0, 1], or collectively over the unit cube; then a continuous mapping is defined from this parameter space into the colorant space. The image of this mapping is, therefore, a 3-dimensional subspace of the colorant space, and, if the mapping is well chosen, the points in this subspace will correspond to distinct visual colors.

ADVANTAGEOUS EFFECT OF THE INVENTION

One of the features that distinguishes the present invention from that of Van de Capelle et al. is that, instead of making K depend directly on C, M, and Y, it makes all four colorant signals dependent on the coordinates of the abstract parameter space. This additional level of abstraction provides the flexibility needed for alternative definitions of "neutral" and for direct incorporation of the TAC constraint into the formalism.

An apparent, but false, similarity between the prior art and the present invention is that in both the final colorant vector, CMYK, is dependent on a vector in a 3-dimensional space. However, the role of the 3-dimensional vector is quite different in the two cases: in the prior art it was an initial vector in the colorant-signal space which was selected so as to reproduce the desired color approximately, with primaries alone (in the absence of black), while in the current approach it is a vector in an abstract parameter space which has a meaning only through the mapping into the 4-dimensional colorant space. In the present invention, by distinction, the accurate reproduction of color is achieved through the use of a separate calorimetric transformation; the parameter space and the mapping into the colorant space are then free of calorimetric concerns and are used only to select the desired utilization of the black colorant.

BRIEF DESCRIPTION OF THE DRAWINGS

In order to respectively depict 3- and 4-dimensional relationships in 2- and 3-dimensional diagrams, the following figures are drawn for the case m=y.

FIG. 3(*b*) is a similar diagram for the magenta- and yellow-colorant signals; FIG. 3(*c*) is a similar diagram for the black colorant signal.

To facilitate understanding, identical reference symbols have been used, where possible, to designate identical elements that are common to the figures.

DETAILED DESCRIPTION OF THE INVENTION

Figure 1:
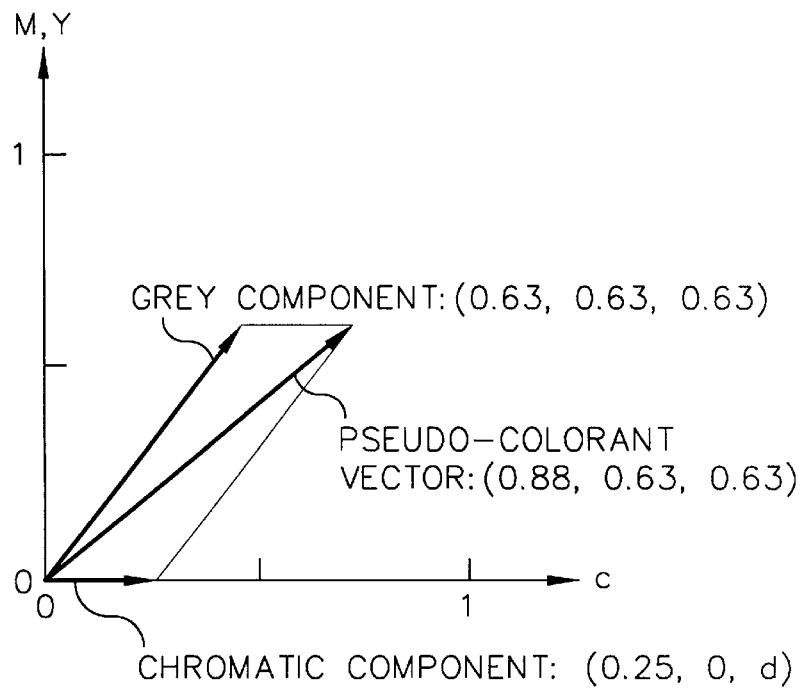
FIG. 1 is a 2-dimensional diagram demonstrating the resolution of an arbitrary pseudo-colorant vector, in cmy-space, into a grey component and a chromatic component.

In the following description, the present invention will be described in the preferred embodiment as a software program. Those skilled in the art will readily recognize that the equivalent of such software may be constructed in hardware.

Still further, as used herein, computer readable storage medium may comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

The description below is particular to the 4-color CMYK process in common use in offset lithography and other color-reproduction technologies, which constitute a particular and important application of this approach. However, the recommended approach has much broader application, and the description should not be construed as limiting the scope of the invention, but rather as illustrating a preferred embodiment.

It is instructive to note that the present invention is implemented in software and that the drawings illustrate either steps of the software program or illustrations useful in understanding the present invention.

The present invention utilizes well known modern calorimetric technology for the creation of CMYK separations for printing or proofing. Thus, without discussing in detail this well known technology, the present invention includes a previously determined calorimetric model of the color-reproduction process, whereby a mathematical transformation from colorant space to color space has been prepared in the form [CMYK→L*a*b*], and this transformation is defined over the entire unit hypercube: $0 \leq C, M, Y, K \leq 1$. (Other spaces based on colorimetry could be used here instead of CIELAB.) We will refer to this transformation as R. Thus, $$(L^*, a^*, b^*) = R(C, M, Y, K).$$

For reasons that will become apparent shortly, we introduce the notation cmy for the parameter space. We will refer to the mapping from parameter space to colorant space, [cmy→CMYK], as S:

$$(C, M, Y, K) = S(c, m, y).$$

The sequential application of S and R, [cmy→CMYK→L*a*b*], can be replaced by the application of their composite, [cmy→L*a*b*], which we will call T:

$$(L^*, a^*, b^*) = R(S(c, m, y)) = T(c, m, y).$$

Formally, T has the structure of a transformation from a 3-dimensional parameter space into a color space. Accordingly, the coordinates of the parameter space are analogous to the colorants of an imaginary process that reproduces colors in a way modeled by the transformation T. This interpretation justifies the cmy labeling of the parameters; c, m, and y can be regarded as "pseudo-colorant" signals. In addition, since the pseudo-colorant space is 3-dimensional, T will have an unique inverse (as long as it is non-singular).

The desired transformation, [L*a*b*→CMYK], can now be computed at a regular sampling of points (say, on a rectangular grid in CIELAB space), as described above, in order to create an interpolation table. At each point, the inverse of T is computed by an iterative search technique, such as the Newton-Raphson algorithm; this computation yields the values of the pseudo-colorant signals:

$$(c, m, y) = T^{-1}(L^*, a^*, b^*).$$

The actual colorant signals can then be computed by $$(C, M, Y, K) = S(c, m, y).$$

The use of the parametric representation of the constraint in pseudo-colorant space permits the independent incorporation of the TAC constraint, off-axis behavior of the black colorant, and various definitions of "neutral". These features can be exemplified by the specific form of the S transformation in the preferred embodiment.

As stated above, the pseudo-colorant signals are allowed to range over the unit cube in parameter space. The neutral axis is defined as the principal diagonal of this cube, i.e., by the condition: c=m=y.

The mapping from parameter space to colorant space is conveniently defined in terms of two new variables, lambda and mu:

$$\lambda = \max(c, m, y) - \min(c, m, y),$$

$$\mu = \min(c, m, y).$$

Thus, λ provides a measure of the imbalance in the pseudo-colorant vector: λ=0 for neutrals, since the pseudo-colorant signals are equal there, and λ=1 for the most saturated colors, since the highest pseudo-colorant signal will have a value of 1, while the lowest pseudo-colorant signal will have the value zero. The variable μ provides a measure of the grey component of the pseudo-colorant vector. Referring to FIG. 1, in general, any cmy vector can be resolved into the vector sum of a grey, or achromatic, component, in which the pseudo-colorant signals are equal to one another, and a chromatic component, in which at least one of the pseudo-colorant signals is zero. It facilitates understanding to again note that for clarity in FIG. 1 the three-dimensional representation is reduced to two dimensions by making m=y. The chromatic component, by itself, would reproduce a saturated color; the grey component, by itself, would reproduce a neutral, but, when added to the chromatic component, it serves to darken and desaturate the resulting color.

Figure 2:
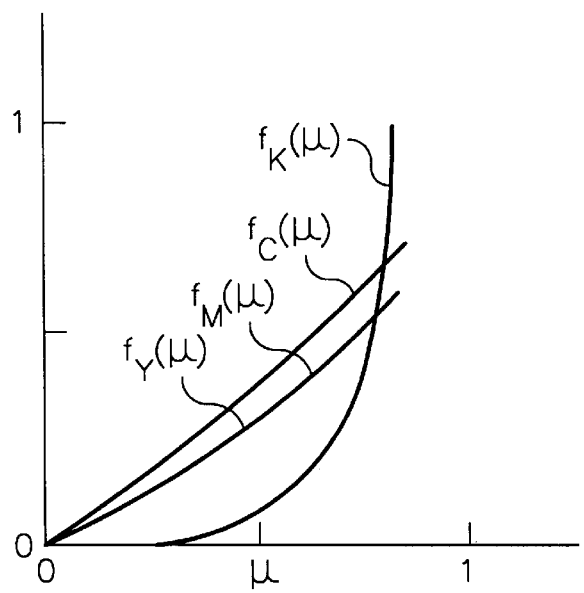
FIG. 2 is a 2-dimensional graph indicating a possible choice of colorant mappings on the neutral axis.

Referring to FIG. 2, on the neutral axis, where λ=0, the colorant signals can be defined by:

$$C = f_C(\mu),$$

$$M = f_M(\mu),$$

$$Y = f_Y(\mu),$$

$$K = f_K(\mu).$$

These four mapping functions can be defined in any convenient manner—for instance, in a representation by means of polynomials or splines. However, they must be monotonically increasing over the interval [0, 1], with $$f_C(0) = f_M(0) = f_Y(0) = f_K(0) = 0.$$

Since all 4 colorant signals increase with μ, the resulting color of the overprint will darken progressively. Each value of μ will then correspond to a distinct color, and the T transformation will be non-singular and invertible.

An example of colorant mapping functions is shown in FIG. 2. The function for the black channel, $f_K(\mu)$, provides a flexible mechanism for controlling the amount of black colorant used in printing neutrals. Typically it is set identically to zero for an initial range of its argument and then rises progressively to a maximum value of $K_{max} = f_K(1)$ at the end of the neutral axis. Since μ is a measure of the grey component, this function directly defines a particular preferred trade-off between K and CMY and resolves the ambiguity in the rendering of neutrals.

The functions for the primary channels provide flexibility in the definition of the neutral axis and in imposing the TAC constraint. Typically, the functions are chosen to be nearly linear functions of the argument. For instance, if "neutral" is interpreted as meaning "balanced primaries", then the 3 functions can be chosen to be identical and strictly linear in μ:

$$f_C(\mu) = f_M(\mu) = f_Y(\mu) \propto \mu.$$

If conventional "offset-press neutrals" are desired, the functions may be somewhat nonlinear and can be constructed so as to satisfy:

$$f_M(\mu)=f_Y(\mu)<f_C(\mu)$$

or other similar condition. If "true neutrals" are desired, the functions can be computed by a search algorithm that inverts the R transformation so as to maintain constant neutral chromaticity in the colors printed.

Furthermore, the functions can be scaled or normalized so that the sum of the colorant signals at the darkest neutral, $f_C(1)+f_M(1)+f_Y(1)+f_K(1)$, is equal to the desired maximum TAC. Typically this constraint will require that $f_C(1)<1$, $f_M(1)<1$, $f_Y(1)<1$, and $f_K(1)=K_{max} \leq 1$.

Figure 3A:
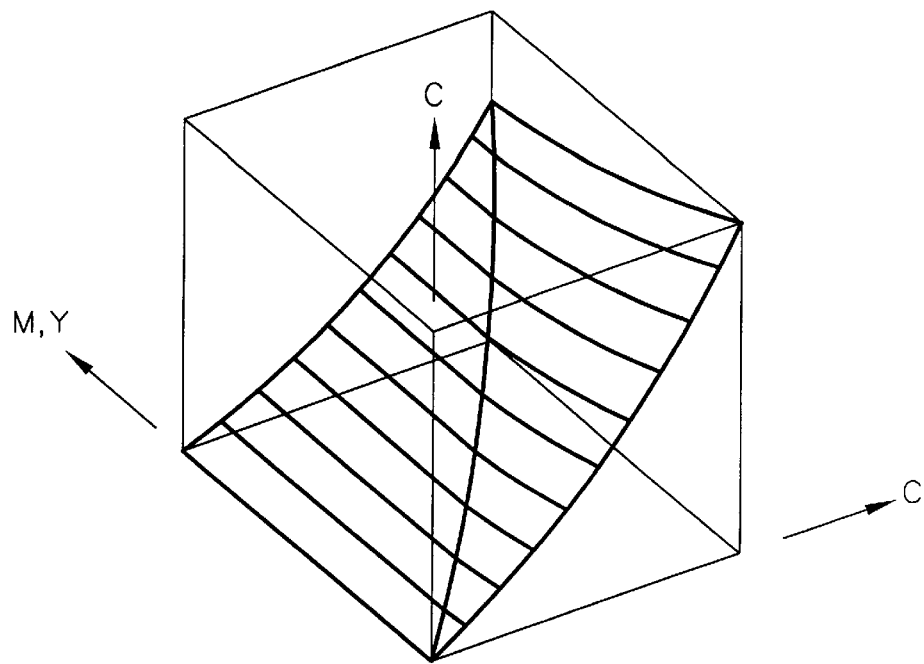
FIG. 3(*a*) is a 3-dimensional diagram showing a possible dependence of the cyan-colorant signal on the pseudo-colorant parameters.
Figure 3B:
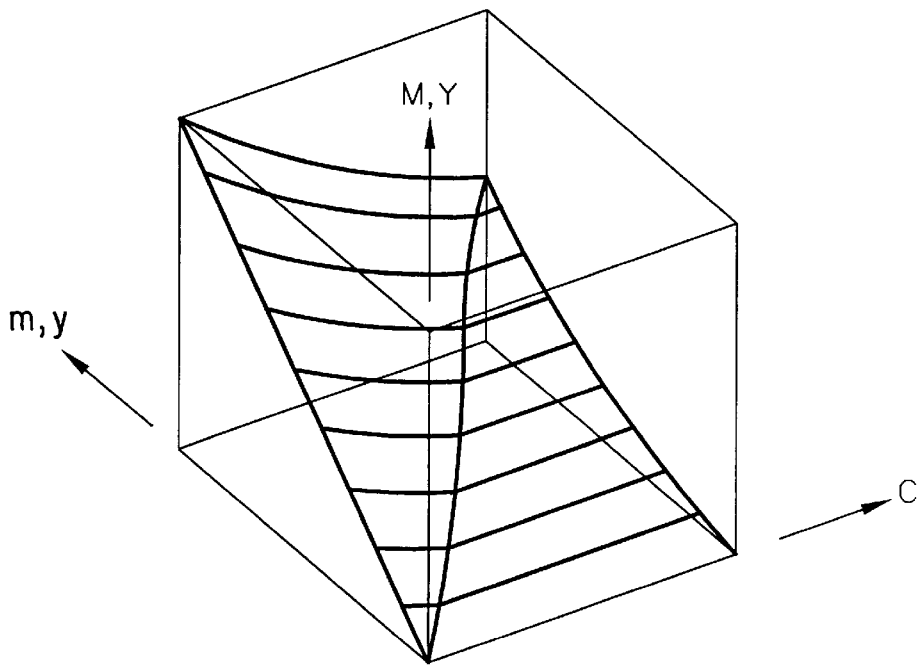
Figure 3C:
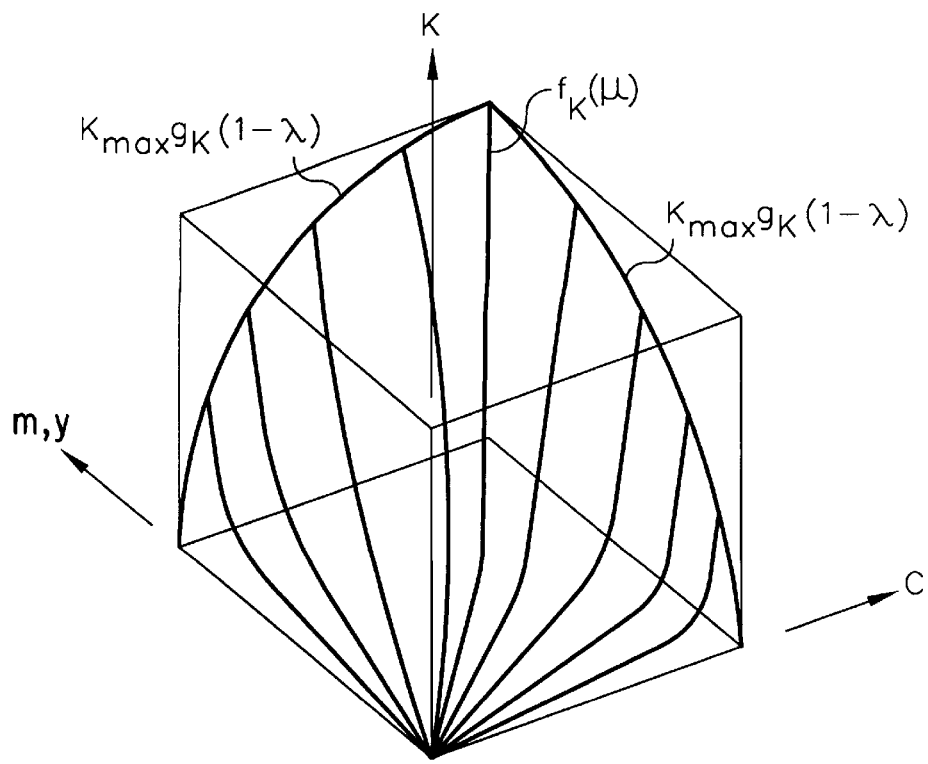

Referring to FIGS. 3a–3c, for $\lambda>0$ these expressions have to be modified so that the colorant signals will have a smooth transition from neutrals to off-axis colors. In order to utilize the full gamut of saturated colors, the primary colorant signals must be permitted to assume values beyond those permitted by the TAC constraint, up to a maximum of 1 (100% dot coverage). A convenient form for this behavior is:

$$C = c + [f_C(c) - c]g_{CMY}\left(\frac{\mu}{c}\right)$$

$$M = m + [f_M(m) - m]g_{CMY}\left(\frac{\mu}{m}\right)$$

$$Y = y + [f_Y(y) - y]g_{CMY}\left(\frac{\mu}{y}\right)$$

where the interpolating function $g_{CMY}(x)$ is monotonically increasing over the interval [0,1], with $g_{CMY}(0)=0$ and $g_{CMY}(1)=1$. This function can be represented as a polynomial, a spline, a simple power law, a power law with offset, an exponential, or in any other convenient form. It can be adjusted to control the off-axis behavior of the primary colorants. Note that these expressions reduce to the on-axis expressions given above when $c=m=y=\mu$. For the most saturated colors, at least one of the primaries will approach zero; under those conditions, $\mu=0$ and the other colorant signals then are identical to the corresponding pseudo-colorant signals and can range over the full interval [0, 1]. FIGS. 3(a) and 3(b) show an example of how the primary colorant signals might vary, for the case m=y.

The black channel can be continued smoothly from the neutral axis into the full cmy-space according to the formula:

$$K = f_K\left(\frac{\mu}{1-\lambda}\right) g_K(1-\lambda)$$

where $g_K$ is a smooth, monotonically-increasing function providing additional control over the off-axis behavior of black. Conventionally, $g_K(0)=0$, and $g_K(1)=1$, so that this expression reduces to the on-axis expression given above when $\lambda=0$. Any convenient form, such as polynomials or splines, can be used for $g_K$. FIG. 3(c) shows an example of the behavior of the black-colorant signal for the case m=y.

This formulation permits independent control over the on-axis and off-axis utilization of the black channel. For instance, once $f_K$ has been chosen so as to provide the preferred on-axis balance between primaries and black, $g_K$ may be adjusted to provide a smooth shape to the color gamut in the region of dark colors, and $g_{CMY}$ may be used to vary the balance between primaries and black in the off-axis region. To see this, consider the behavior of the colorants along the path from the darkest neutral (c=m=y=1) to the most saturated red (c=0, m=y=1) (holding $\lambda+\mu=1$):

$$C=f_C(1-\lambda),$$

$$M=1+[f_M(1)-1]g_{CMY}(1-\lambda),$$

$$Y=1+[f_Y(1)-1]g_{CMY}(1-\lambda),$$

$$K=K_{max}g_K(1-\lambda).$$

Figure 4:
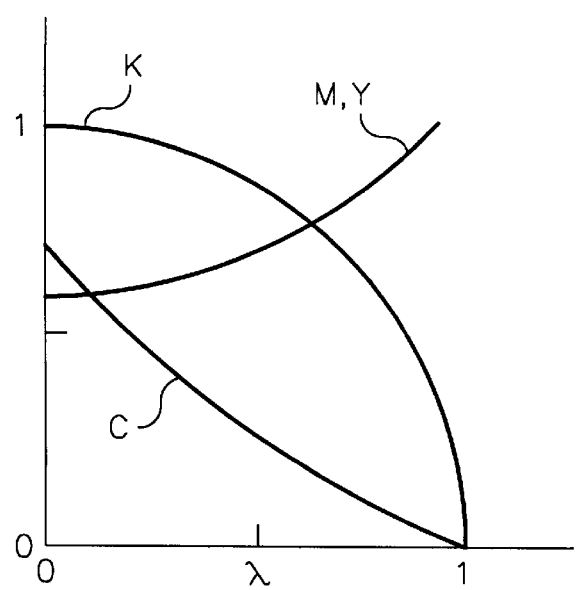
FIG. 4 is a 2-dimensional graph illustrating a possible off-axis behavior of the colorant signals.

As $\lambda$ increases from 0 to 1, $\mu$ decreases from 1 to 0, and the (C, M, Y, K) vector changes smoothly from its on-axis value of $(f_C(1), f_M(1), f_Y(1), K_{max})$ to the value required for saturated red: (0, 1, 1, 0). This behavior is illustrated in FIG. 4. Varying $g_K$ has the effect of controlling the rate of off-axis decrease in the black colorant, while varying $g_{CMY}$ affects the off-axis increase in magenta and yellow. In order to reduce the number of degrees of freedom, it is convenient to formulate the off-axis behavior in terms of a single control. For instance, $g_{CMY}$ can be defined by a power law:

$$g_{CMY}(x)=x^\alpha$$

(A small off set can be added to maintain a finite slope at the origin.) A spline representation for $g_K$ can then be determined so that L* has a particular dependence on $\lambda$ along the aforementioned path from the darkest neutral to saturated red (or, more critically blue):

$$L^*(\lambda)=L^*(1)+[L^*(0)-L^*(1)]g_{CMY}(1-\lambda)$$

In this way the single parameter $\alpha$ can be used to establish a smooth monotonic shape for the gamut boundary along this path and can be varied to obtain the desired off-axis trade-off between black and primary colorants.

The invention has been described with reference to a preferred embodiment. However, it will be appreciated that variations and modifications can be effected by a person of ordinary skill in the art without departing from the scope of the invention.

What is claimed is:

1. A computer product for controlling a color-reproduction process employing N colorants, where N is greater than 3, comprising: a computer readable storage medium having a computer program stored thereon for performing the steps of:

defining a first transformation from an N-dimensional colorant-signal space associated with the color-reproduction process to a 3-dimensional colorimetric space such that each combination of N colorant signals is mapped to a visual color that would be produced by the process in response to that combination of signals;

defining a second transformation for mapping from a 3-dimensional parameter space into the N-dimensional colorant-signal space for defining a particular 3-dimensional subspace of the N-dimensional colorant-signal space for ultimately restricting the permitted combinations of the N colorant signals;

combining the first and second transformations for defining a third transformation for transforming data directly from the 3-dimensional parameter space to the 3-dimensional colorimetric space; and finding the mathematical inverse of the third transformation for defining an inverse transformation which transforms data from the 3-dimensional colorimetric color space to the 3-dimensional parameter space.

2. The computer program product as in claim 1 further comprising computing the N colorant signals corresponding to a given visual color by applying the inverse transformation to transform data representing the given visual color into the 3-dimensional parameter space and then applying the second transformation to transform from the 3-dimensional parameter space to the N-dimensional colorant-signal space.

3. The computer program product as in claim 2 further comprising providing the N colorants as cyan, magenta, yellow, and black.

* * * * *